United States Patent

Saito et al.

(10) Patent No.: US 10,488,297 B2
(45) Date of Patent: Nov. 26, 2019

(54) CHARACTERISTIC-MEASURING APPARATUS AND CHARACTERISTIC-MEASURING METHOD FOR MULTI-CORE FIBER

(71) Applicant: FUJIKURA LTD., Tokyo (JP)

(72) Inventors: Shota Saito, Sakura (JP); Katsuhiro Takenaga, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 15/881,146

(22) Filed: Jan. 26, 2018

(65) Prior Publication Data

US 2018/0246008 A1  Aug. 30, 2018

(30) Foreign Application Priority Data

Feb. 24, 2017 (JP) .................................. 2017-034000

(51) Int. Cl.
*G01M 11/00* (2006.01)

(52) U.S. Cl.
CPC .................................. *G01M 11/33* (2013.01)

(58) Field of Classification Search
CPC . G01M 11/33; G02B 6/02042; H04B 10/0795
See application file for complete search history.

(56) References Cited

U.S. PATENT DOCUMENTS

| | | | | |
|---|---|---|---|---|
| 5,144,374 A | * | 9/1992 | Grego | G01J 3/02 356/301 |
| 6,788,397 B1 | * | 9/2004 | Golowich | G01M 11/33 356/121 |
| 8,456,622 B1 | * | 6/2013 | Estes | G01J 9/02 356/477 |
| 8,923,668 B2 | * | 12/2014 | Hayashi | G01M 11/088 385/31 |
| 9,389,424 B1 | * | 7/2016 | Schowengerdt | G02B 27/0172 |
| 9,513,189 B2 | * | 12/2016 | Jiang | G01M 11/33 |
| 9,995,649 B2 | * | 6/2018 | Schell | G01M 11/3145 |
| 10,203,265 B2 | * | 2/2019 | Hayashi | G01M 11/31 |

(Continued)

FOREIGN PATENT DOCUMENTS

| | | |
|---|---|---|
| JP | S55-18197 U | 2/1980 |
| JP | S63-55505 A | 3/1988 |

(Continued)

OTHER PUBLICATIONS

Yuan, Libo, Zhihai Liu, and Jun Yang. "Coupling characteristics between single-core fiber and multicore fiber." Optics letters 31.22 (2006): 3237-3239. (Year: 2006).*

(Continued)

*Primary Examiner* — Shawn Decenzo
(74) *Attorney, Agent, or Firm* — Osha Liang LLP

(57) ABSTRACT

A characteristic-measuring apparatus for a multi-core fiber includes: a coupling device that couples, at a first end of the multi-core fiber, light to a plurality of cores in the multi-core fiber; an imaging device that takes an image, at a second end of the multi-core fiber, of emission light emitted from the plurality of cores, where the plurality of cores are imaged at the same time; and a calculating device that determines a characteristic of the multi-core fiber based on images obtained by the imaging device.

21 Claims, 8 Drawing Sheets

(56) References Cited

U.S. PATENT DOCUMENTS

| | | | |
|---|---|---|---|
| 2003/0081198 A1* | 5/2003 | Bonja | G01M 11/33 356/73.1 |
| 2004/0067057 A1* | 4/2004 | Akiyama | H04B 10/077 398/26 |
| 2009/0262337 A1* | 10/2009 | Nicholson | G01M 11/331 356/73.1 |
| 2010/0215311 A1* | 8/2010 | Moore | G01B 11/18 385/13 |
| 2014/0003779 A1* | 1/2014 | Arakawa | G02B 6/02042 385/127 |
| 2014/0003807 A1* | 1/2014 | Hamaguchi | H04B 10/0795 398/29 |
| 2015/0116700 A1* | 4/2015 | Meek | G01M 11/331 356/73.1 |
| 2016/0161673 A1* | 6/2016 | Hamaguchi | G02B 6/02042 65/378 |
| 2016/0223761 A1* | 8/2016 | Nakanishi | G02B 6/3843 |
| 2017/0123146 A1* | 5/2017 | Chen | G02B 6/02042 |
| 2017/0167899 A1* | 6/2017 | Amezcua-Correa | G01K 11/3206 |
| 2017/0322111 A1* | 11/2017 | Schell | G01M 11/3145 |
| 2018/0038769 A1* | 2/2018 | Hayashi | G01M 11/31 |
| 2018/0100782 A1* | 4/2018 | Hayashi | G01M 11/33 |
| 2018/0246007 A1* | 8/2018 | Saito | G01M 11/33 |
| 2018/0246275 A1* | 8/2018 | Saito | G02B 6/02042 |
| 2018/0340861 A1* | 11/2018 | Schell | G01M 11/333 |
| 2019/0011623 A1* | 1/2019 | Hayashi | G02B 6/0006 |

FOREIGN PATENT DOCUMENTS

| | | |
|---|---|---|
| JP | 2004-112427 A | 4/2004 |
| JP | 2013050656 A | 3/2013 |
| JP | 2015-081779 A | 4/2015 |
| JP | 2015-230263 A | 12/2015 |
| JP | 2016-057297 A | 4/2016 |
| JP | 2016-085120 A | 5/2016 |
| JP | 2016-099290 A | 5/2016 |
| JP | 2017-156335 A | 9/2017 |

OTHER PUBLICATIONS

R. Okuno et al; "Cutoff Wavelength Measurement of Two Core Multi-core Fiber"; Proc. of 2013 18th OptoElectronics and Communications Conference held jointly with 2013 International Conference on Photonics in Switching (OECC/PS); Kyoto, Japan, MS1-3; Jun. 30-Jul. 4, 2013 (2 pages).

S. Saitoh et al., "A study on a new method for measuring inter-core crosstalk of multi-core fibers", Program of the 2016 IEICE General Conference, The Institute of Electronics, Information and Communication Engineers, Mar. 1, 2016, p. 305 (3 pages).

Office Action in corresponding Japanese Patent Application No. 2017-034000, dated Jan. 8, 2019, with translation (7 pages).

\* cited by examiner

CHARACTERISTIC-MEASURING APPARATUS AND CHARACTERISTIC-MEASURING METHOD FOR MULTI-CORE FIBER

CROSS-REFERENCE TO RELATED APPLICATIONS

The present application claims priority to Japanese Patent Application No. 2017-034000, filed Feb. 24, 2017. The contents of the priority application are incorporated by reference in their entirety.

TECHNICAL FIELD

The present invention relates to a characteristic-measuring apparatus and a characteristic-measuring method for a multi-core corcoe fiber.

BACKGROUND

In recent years, the communication traffic volume has dramatically increased through progress of information technology, and it is expected that the communication traffic volume will further increase hereafter. In order to handle such an increase of the communication traffic volume, optical communication systems are required to further increase their communication capacity (transmission capacity). However, it is expected that conventional optical communication systems using single-mode fibers (SMFs) will reach the limit of their capacity. As a technology to go beyond the limit, research and development of spatial division multiplexing (SDM) are being actively conducted. An optical fiber for performing SDM includes a multi-core fiber (MCF), in which one optical fiber is provided with a plurality of cores, and information is transmitted through each core, thereby increasing the transmission capacity.

The following Patent Documents 1 to 4 disclose prior art for measuring characteristics of a multi-core fiber. To be specific, Patent Document 1 (Japanese Unexamined Patent Application, First Publication No. 2016-99290) discloses a technology, in which images of interference fringes of interference light between object light passed through a multi-core fiber and reference light are obtained, and the waveguide mode of each core of the multi-core fiber is evaluated. Patent Document 2 (Japanese Unexamined Patent Application, First Publication No. 2016-57297) discloses a technology, in which cores are connected to each other at each position of two ends of an optical fiber provided with a plurality of cores, and optical characteristics of the optical fiber are measured in a state where the plurality of cores are connected in series.

Patent Document 3 (Japanese Unexamined Patent Application, First Publication No. 2015-230263) discloses a technology, in which pulse light is led into an optical fiber-transmission path including two different reference fibers and a multi-core fiber, and the loss component depending on structural components of the multi-core fiber is evaluated from the result of determining the intensity of backscattered light from two ends of the optical fiber-transmission path and from the crosstalk of the multi-core fiber measured by any method. Patent Document 4 (Japanese Unexamined Patent Application, First Publication No. 2015-81779) discloses a technology, in which light is led into a plurality of cores provided in an optical waveguide (an optical fiber) all together through first end surfaces of the cores, the brightness of emission light is measured through imaging a plurality of images of a second end surface of each core, and the insertion loss of each core is determined.

A Non-Patent Document 1 (R. Okuno et al., "Cutoff Wavelength Measurement of Two Core Multi-core Fiber", Proc. of 2013 18th OptoElectronics and Communications Conference held jointly with 2013 International Conference on Photonics in Switching (OECC/PS), Kyoto, Japan, MS1-3.) discloses a measurement method of the cut-off wavelength of a multi-core fiber including two cores, in which light is led into the cores, and light emitted from the two cores is received without distinction.

In a multi-core fiber, since information is transmitted through each of cores provided in one optical fiber as described above, measurement with respect to each of the cores may be needed according to a characteristic of the multi-core fiber to be measured. For example, with respect to the cut-off wavelength of the multi-core fiber, measurement for each core is needed.

As a method of measuring the cut-off wavelength of an optical fiber, the multi-mode excitation method, the bending method or the like is known. In the multi-mode excitation method, the cut-off wavelength is measured based on a ratio between transmitted light power of a multi-mode fiber (a reference fiber) serving as a reference and transmitted light power of an object optical fiber when the object optical fiber is multi-mode excited (excited under multi-mode operation). In the bending method, the cut-off wavelength is measured based on the ratio between values of transmitted light power of an object optical fiber when different bending diameters (for example, bending diameter of 280 mm×1 turn, and bending diameter of 280 mm×1 turn and bending diameter of 60 mm×1 turn, or the like) are applied to the object optical fiber while the object optical fiber is multi-mode excited. The multi-mode excitation of the object optical fiber is obtained by leading transmitted light of the multi-mode fiber into a core of the object optical fiber.

When the cut-off wavelength of each core of a multi-core fiber is measured using these methods, it is necessary to multi-mode excite each of cores provided in the multi-core fiber. To be specific, an operation, in which the above multi-mode fiber is coupled to only one core of the cores provided in the multi-core fiber, and the cut-off wavelength is measured by receiving light emitted from the core coupled with the multi-mode fiber, has to be repeated as many times as the number of cores provided in the multi-core fiber. In this way, in order to measure characteristics of each core of the multi-core fiber, complicated work may be required, and the measuring time may increase.

In addition, the above conditions do not occur only in a case where the cut-off wavelength of the multi-core fiber is measured, but may also occur in a case where other characteristics of the multi-core fiber are measured. The other characteristics of the multi-core fiber include, for example, loss of the multi-core fiber, polarization mode dispersion (PMD), effective core area ($A_{eff}$), mode field diameter (MFD) and the like.

SUMMARY OF INVENTION

One or more embodiments of the present invention provide a characteristic-measuring apparatus and a characteristic-measuring method for a multi-core fiber, in which characteristics of each core of the multi-core fiber can be simply and easily measured in a short time.

In one or more embodiments, a characteristic-measuring apparatus for a multi-core fiber includes: a coupling device that couples, at a first end of the multi-core fiber, light to a plurality of cores provided in the multi-core fiber; an imaging device that images, at a second end of the multi-core fiber, emission light emitted from the plurality of cores at the same time; and a calculating device that determines a characteristic of the multi-core fiber based on images obtained by the imaging device.

In one or more embodiments, a characteristic-measuring apparatus for a multi-core fiber further includes a wavelength variable device capable of changing a wavelength of light to be led into the multi-core fiber or of light emitted from the multi-core fiber.

In one or more embodiments, the wavelength variable device includes: a light source that outputs incoherent light having at least a plurality of wavelength components within a wavelength band required to measure the characteristic of the multi-core fiber, and a first wavelength filter that extracts light having a specific wavelength component from the incoherent light output from the light source and outputs extracted light to the coupling device.

In one or more embodiments, the wavelength variable device includes: a wavelength variable light source that outputs, to the coupling device, coherent light whose wavelength is capable of being changed within at least a wavelength band required to measure the characteristic of the multi-core fiber.

In one or more embodiments, the wavelength variable device includes: a second wavelength filter that extracts light having a specific wavelength component from light emitted from the multi-core fiber and outputs extracted light to the imaging device.

In one or more embodiments, the coupling device includes: an optical fiber including a core having a diameter greater than or equivalent to that of a circumscribed circle of the plurality of cores provided in the multi-core fiber.

In one or more embodiments, the imaging device is configured to image (i.e., take an image), at the second end of the multi-core fiber, a near-field image of the emission light emitted from the plurality of cores.

In one or more embodiments, the calculating device is configured to determine the characteristic of the multi-core fiber based on the images, the images being obtained by the imaging device while the wavelength of light to be led into the multi-core fiber or of light emitted from the multi-core fiber is changed by the wavelength variable device.

In one or more embodiments, a characteristic-measuring method for a multi-core fiber includes: a first step of coupling, at a first end of the multi-core fiber, light to a plurality of cores provided in the multi-core fiber; a second step of imaging, at a second end of the multi-core fiber, emission light emitted from the plurality of cores at the same time; and a third step of determining a characteristic of the multi-core fiber based on images obtained at the second step.

In one or more embodiments, in the second step, imaging is conducted at the second end of the multi-core fiber while a wavelength of light to be led into the multi-core fiber or of light emitted from the multi-core fiber is changed.

According to one or more embodiments of the present invention, light is coupled, at the first end of the multi-core fiber, to the plurality of cores provided in the multi-core fiber, the emission light emitted from the plurality of cores is imaged at the second end of the multi-core fiber at the same time, and the characteristic of each core of the multi-core fiber is determined based on obtained images. Therefore, the characteristic of each core of the multi-core fiber can be simply and easily measured in a short time.

DETAILED DESCRIPTION

Figure 1:
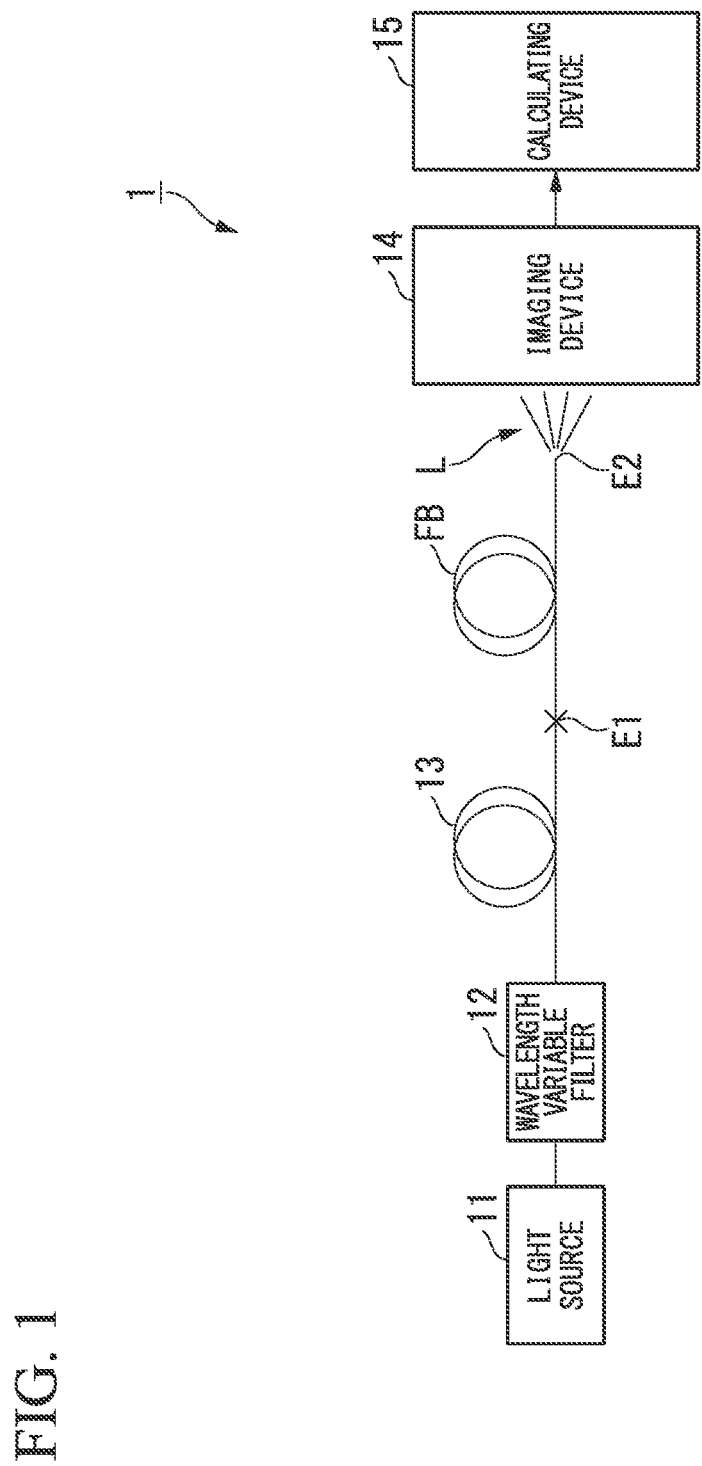
FIG. 1 is a block diagram showing a main part configuration of a characteristic-measuring apparatus for a multi-core fiber according to one or more embodiments of the present invention.

Hereinafter, characteristic-measuring apparatuses and characteristic-measuring methods for a multi-core fiber of embodiments of the present invention are described in detail with reference to the drawings. In the drawings to be referred to below, in order to facilitate understanding, each member may be shown such that the dimensions thereof are appropriately changed as needed.

FIG. 1 is a block diagram showing a main part configuration of a characteristic-measuring apparatus for a multi-core fiber of one or more embodiments of the present invention. As shown in FIG. 1, a characteristic-measuring apparatus 1 includes a light source 11 (a wavelength variable device), a wavelength variable filter 12 (a wavelength variable device, a first wavelength filter), a multi-mode fiber 13 (a coupling device, an optical fiber), an imaging device 14 and a calculating device 15, and measures characteristics of a multi-core fiber FB that is a measurement object. In one or more embodiments, as an example, a case is described where a cut-off wavelength of the multi-core fiber FB that is a characteristic thereof is measured.

The light source 11 outputs light required to measure the cut-off wavelength of the multi-core fiber FB. To be specific, the light source 11 outputs incoherent light having at least a plurality of wavelength components within a wavelength band required to measure the cut-off wavelength of the multi-core fiber FB. For example, the light source 11 outputs incoherent light having wavelength components within a band having a wavelength less than that of the O-band (<1260 nm), the O-band (1260 to 1360 nm), the E-band (1360 to 1460 nm), the S-band (1460 to 1530 nm), the C-band (1530 to 1565 nm), the L-band (1565 to 1625 nm), the U-band (1625 to 1675 nm), a band having a wavelength greater than that of the U-band (>1625 nm), all or some of these wavelength bands. For example, a white light source, an ASE (Amplified Spontaneous Emission) light source, an LED (Light Emitting Diode) or the like can be used for the light source 11.

The wavelength variable filter 12 extracts light having a specific wavelength component from the incoherent light output from the light source 11 and outputs the extracted light to the multi-mode fiber 13. The wavelength variable filter 12 can change the wavelength component of light to be extracted. For example, a bandpass filter capable of changing the pass wavelength band thereof can be used for the wavelength variable filter 12. The wavelength variable filter 12 may be a filter capable of continuously changing the wavelength component of light to be extracted, and as long as the required measurement accuracy is secured, the wavelength variable filter 12 may be a filter that discretely changes the wavelength component. In addition, a wavelength filter not capable of changing the wavelength component of light to be extracted may be used instead of the wavelength variable filter 12. In a case where such a wavelength filter is used, a plurality of filters may be prepared in which the wavelength components of light to be extracted are different from each other, and the filters may be replaced as needed. A monochromator may be used instead of the wavelength variable filter 12.

Figure 2A:
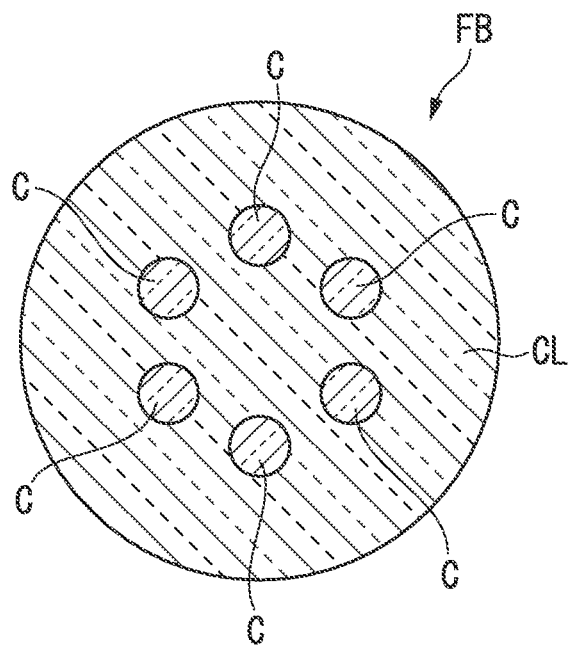
FIG. 2A is a cross-sectional view of the multi-core fiber.
Figure 2B:
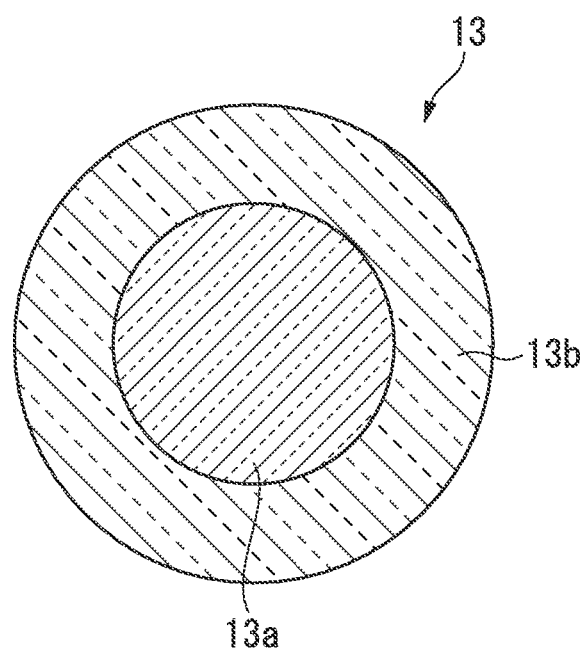
FIG. 2B is a cross-sectional view of a multi-mode fiber.

The multi-mode fiber 13 is connected (for example, fused) to a first end E1 of the multi-core fiber FB. The multi-mode fiber 13 couples, at the first end E1 of the multi-core fiber FB, light, which is output from the wavelength variable filter 12, to a plurality of cores C (refer to FIGS. 2A and 2B) provided in the multi-core fiber FB, and is used for multi-mode exciting the plurality of cores C at the same time. FIGS. 2A and 2B are diagrams for showing the core diameter of the multi-mode fiber. FIG. 2A is a cross-sectional view of the multi-core fiber FB. FIG. 2B is a cross-sectional view of the multi-mode fiber 13.

As shown in FIG. 2A, the multi-core fiber FB includes the plurality of cores C, and a common cladding CL covering circumferential surfaces of all of the cores C. The plurality of cores C are annularly arranged in a cross-section perpendicular to the longitudinal direction of the multi-core fiber FB. All of the cores C are capable of single-mode transmission within a desired transmission band. Although the multi-core fiber FB shown in FIG. 2A as an example includes six cores C, the number of the cores C provided in the multi-core fiber FB may be two or more, and the refractive index profile of and the position of each core are arbitrary. The refractive index of the cladding CL is set to be lower than that of the core C. The mediums forming the core C and the cladding CL include quarts glass (silica glass), multicomponent glass, plastic and the like. A coating material may be provided so as to cover the circumferential surface of the cladding CL. The length of the multi-core fiber FB may be set to 2 m or 22 m according to the measurement rule of the cut-off wavelength.

As shown in FIG. 2B, the multi-mode fiber 13 includes one core 13a, and a cladding 13b covering a circumferential surface of the core 13a. The diameter of the core 13a may have a dimension such that the core 13a can cover the plurality of cores C provided in the multi-core fiber FB. To be specific, the diameter of the core 13a may be greater than or equivalent to that of a circumscribed circle of the plurality of cores C provided in the multi-core fiber FB. The term "equivalent" means that the diameter of the core 13a is allowed to be slightly less than that of the above circumscribed circle due to a manufacturing error or the like of the multi-mode fiber 13.

The diameter of the core 13a of the multi-mode fiber 13 has a dimension such that the core 13a can cover the plurality of cores C provided in the multi-core fiber FB, in order that the cut-off wavelength of the multi-core fiber FB can be simply and easily measured in a short time. That is, in one or more embodiments, the plurality of cores C provided in the multi-core fiber FB are not individually multi-mode excited as the related art, but the plurality of cores C provided in the multi-core fiber FB are multi-mode excited and measured at the same time, whereby the cut-off wavelength of the multi-core fiber FB is simply and easily measured in a short time.

The core 13a of the multi-mode fiber 13 may be a SI (Step Index) core or a GI (Graded Index) core. The refractive index of the cladding 13b is set to be lower than that of the core 13a. The mediums forming the core 13a and the cladding 13b include quarts glass (silica glass), multicomponent glass, plastic and the like similar to that of the multi-core fiber FB. Similarly to the multi-core fiber FB, a coating material may be provided on an outer circumferential surface of the cladding 13b so as to cover the circumferential surface.

The imaging device 14 images, at a second end E2 of the multi-core fiber FB, emission light L emitted from the plurality of cores C provided in the multi-core fiber FB at the same time. The imaging device 14 is disposed apart from the second end E2 of the multi-core fiber FB and images emission light L emitted from the plurality of cores C provided in the multi-core fiber FB and transmitted through a space between the second end E2 of the multi-core fiber FB and the imaging device 14, at the same time. Since the plurality of cores C provided in the multi-core fiber FB are multi-mode excited at the same time as described above, the imaging device 14 is configured to image the emission light emitted from the plurality of cores C at the same time.

Figure 3A:
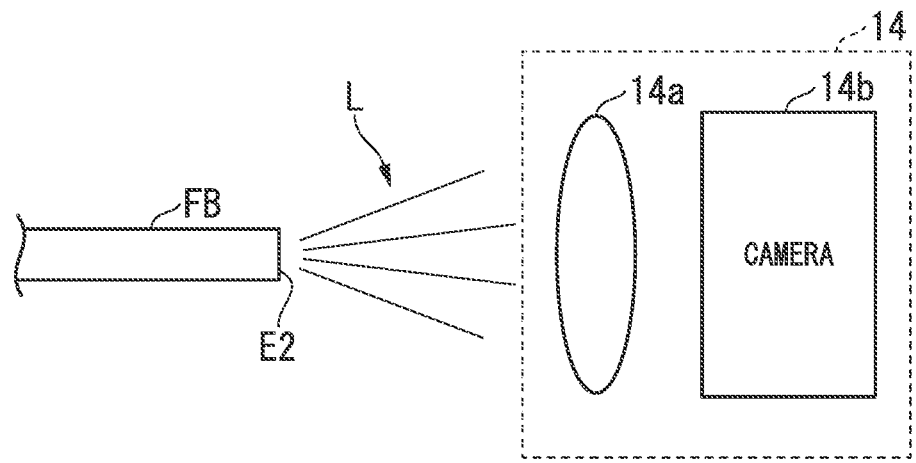
FIG. 3A is a diagram showing a configuration example of imaging device according to one or more embodiments of the present invention.
Figure 3B:
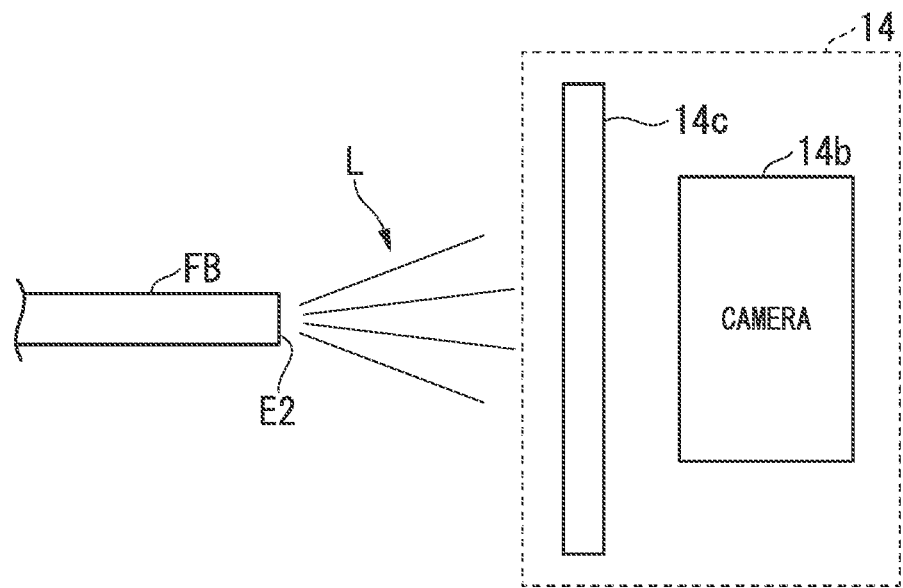
FIG. 3B is a diagram showing another configuration example of imaging device according to one or more embodiments of the present invention.

FIGS. 3A and 3B are diagrams showing configuration examples of imaging device according to one or more embodiments of the present invention. The configuration example shown in FIG. 3A includes a lens 14a and a camera 14b. The lens 14a focuses, on an imaging surface (not shown) of the camera 14b, emission light L emitted from the plurality of cores C provided in the multi-core fiber FB and transmitted through a space between the second end E2 of the multi-core fiber FB and the imaging device 14. The camera 14b includes, for example, a CCD (Charge Coupled Device), an InGaAs (Indium Gallium Arsenide) photodiode, an InGaAs imagesensor or the like, and obtains an optical image focused on the imaging surface by the lens 14a.

The configuration example shown in FIG. 3B includes a screen 14c and a camera 14b. The screen 14c is applied with, for example, fluorescent paint that converts infrared light into visible light, and visualizes the emission light L by projecting the emission light L thereon. The camera 14b is the same as one shown in FIG. 3A and images the emission light L visualized by being projected on the screen 14c. Even when either of the imaging devices 14 shown in FIGS. 3A and 3B is used, it is possible to image a near-field image of emission light emitted from the plurality of cores C provided in the multi-core fiber FB.

The calculating device 15 determines the cut-off wavelength of each core of the multi-core fiber FB based on images obtained by the imaging device 14. To be specific, the calculating device 15 determines the cut-off wavelength of each core of the multi-core fiber FB based on images, and the images are obtained by the imaging device 14 while the wavelength of light to be led into the multi-core fiber FB is changed by the wavelength variable filter 12. Basically, the calculating device 15 determines the cut-off wavelength of each core of the multi-core fiber FB through calculation similar to calculation to be conducted when the cut-off wavelength is measured using the multi-mode excitation method.

That is, the calculating device 15 conducts calculation to determine a ratio between an image (a first image) obtained under a condition and an image (a second image) obtained under a condition different from the condition under which the first image is obtained, and thus determines all of the cut-off wavelengths of the plurality of cores C provided in the multi-core fiber FB. Each of the above first and second images is a two-dimensional image (a near-field image), which is obtained while the wavelength is changed under each of the above conditions, and each of the above first and second images can be regarded as a spectral image having two-dimensional intensity distribution. That is, the spectral images of the plurality of cores can be separated from each other.

Figure 4:
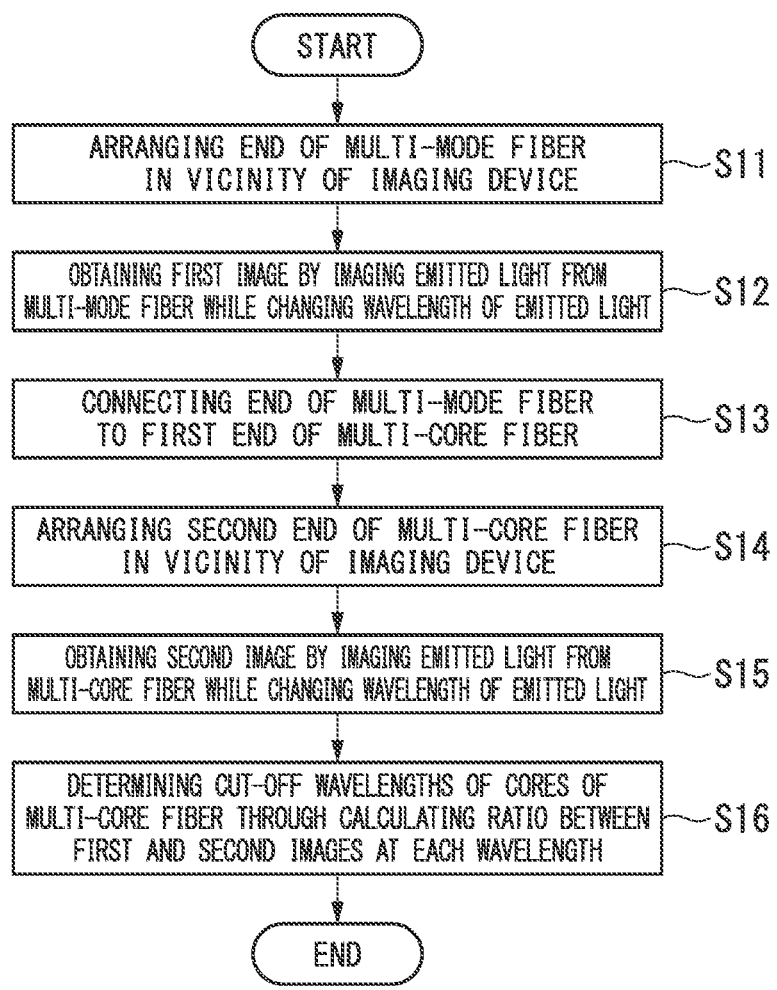
FIG. 4 is a flowchart showing an example of measurement procedure using the characteristic-measuring apparatus according to one or more embodiments (the multi-mode excitation method) of the present invention.

Next, measuring methods for the cut-off wavelength of the multi-core fiber FB are described. First, an example of measuring method using the multi-mode excitation method is described. FIG. 4 is a flowchart showing an example of measurement procedure using the characteristic-measuring apparatus according to one or more embodiments (the multi-mode excitation method) of the present invention. First, an end of the multi-mode fiber 13, to which the multi-core fiber FB is not connected, is arranged in the vicinity of the imaging device 14 (the step S11). For example, the end of the multi-mode fiber 13 is arranged in the position of the second end E2 of the multi-core fiber FB shown in FIG. 1 (the position in which the second end E2 of the multi-core fiber FB is to be arranged).

Next, the light source 11 outputs light, and the imaging device 14 images emission light emitted from the end of the multi-mode fiber 13. To be specific, in a state where light is output from the light source 11, the imaging device 14 images emission light emitted from the end of the multi-mode fiber 13 while the wavelength of the emission light is changed by controlling the wavelength variable filter 12. In this way, the above first image is obtained (the step S12). The obtained first image is stored in the calculating device 15. The condition under which the first image is obtained may be that imaging is conducted in a state where the multi-core fiber FB is not connected to the multi-mode fiber 13.

Next, the end of the multi-mode fiber 13 is connected to the first end E1 of the multi-core fiber FB (the step S13). At this time, the end of the multi-mode fiber 13 is connected to the first end E1 of the multi-core fiber FB such that, at the first end E1 of the multi-core fiber FB, the plurality of cores C shown in FIG. 2A are covered with the core 13a of the multi-mode fiber 13 shown in FIG. 2B. Then, as shown in FIG. 1, the second end E2 of the multi-core fiber FB, in which the first end E1 thereof is connected with the multi-mode fiber 13, is arranged in the vicinity of the imaging device 14 (the step S14).

In addition, before the connection between the end of the multi-mode fiber 13 and the multi-core fiber FB, a specific core C of the multi-core fiber FB may be made to be strongly excited, the second end E2 of the multi-core fiber FB may be arranged in the vicinity of the imaging device 14 as shown in FIG. 1, and thereby the position of the specific core C may be checked in an obtained image. The length of the multi-core fiber FB is, for example, 2 m, 22 m or the like.

Next, the light source 11 outputs light, and the imaging device 14 images emission light emitted from the second end E2 of the multi-core fiber FB. At this time, the light output from the light source 11 passes through the wavelength variable filter 12 and the multi-mode fiber 13 in this order and thereafter is coupled, at the first end E1 of the multi-core fiber FB, to the plurality of cores C provided in the multi-core fiber FB (the first step). The light coupled to the plurality of cores C is transmitted through each of the cores C, thereafter is emitted as the emission light L from the second end E2 of the multi-core fiber FB, and is imaged by the imaging device 14 at the same time (the second step). Then, in a state where light is output from the light source 11, the imaging device 14 images the emission light L emitted from the second end E2 of the multi-core fiber FB while the wavelength of the emission light L is changed by controlling the wavelength variable filter 12. In this way, the above second image is obtained (the step S15). The condition under which the second image is obtained is that imaging is conducted in a state where the multi-core fiber FB is connected to the multi-mode fiber 13.

When the second image is obtained, the calculating device 15 conducts calculation to determine the cut-off wavelength of the multi-core fiber FB based on the first and second images (the third step). To be specific, calculation is conducted to determine, at each wavelength, a ratio (an intensity ratio) between the first image obtained at the step S12 and the second image obtained at the step S15, and the wavelength in which a variation of the intensity ratio occurs is determined with respect to each core C (the step S16). In this way, the cut-off wavelengths of the plurality of cores C provided in the multi-core fiber FB are determined all together.

In the multi-mode excitation method, a condition for obtaining the first image and a condition for obtaining the second image exist other than the above conditions. For example, the steps S13 and S14 may be performed first, a state where the fiber length of the multi-core fiber FB is increased may be made at the time of obtaining the first image, and a state where the fiber length of the multi-core fiber FB is set to be less than that at the time of obtaining the first image may be made at the time of obtaining the second image. The difference between the fiber lengths of the multi-core fiber FB at the above two conditions is, for example, 2 m or 22 m.

Figure 5:
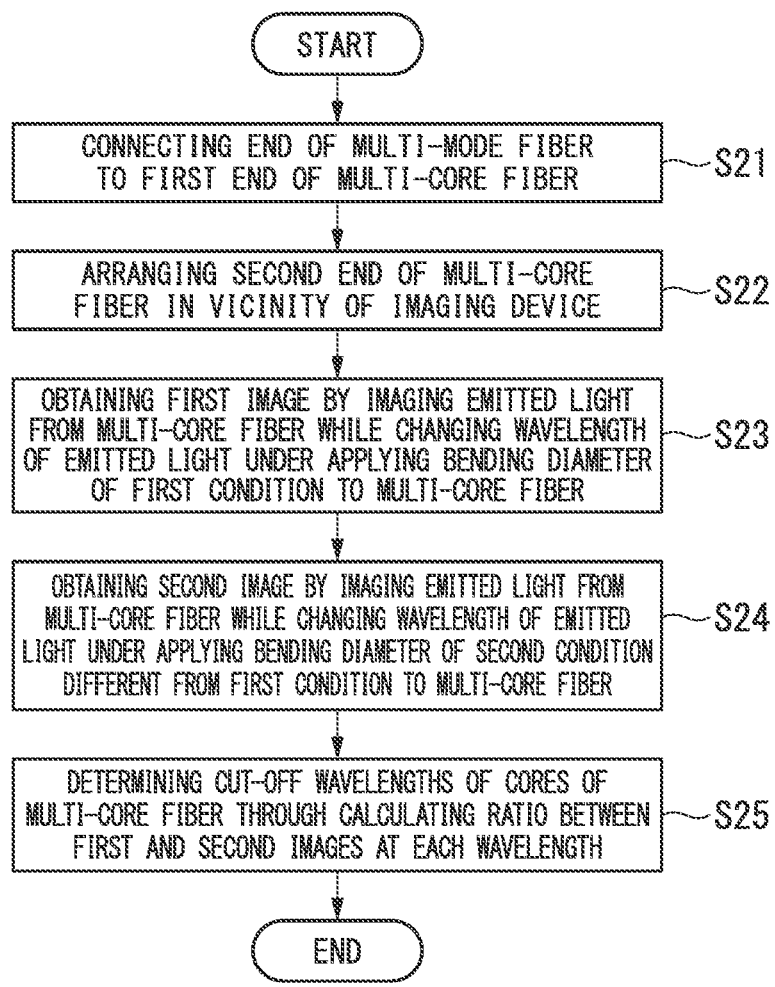
FIG. 5 is a flowchart showing an example of measurement procedure using the characteristic-measuring apparatus according to one or more embodiments (the bending method) of the present invention.

Next, an example of measuring method using the bending method is described. FIG. 5 is a flowchart showing an example of measurement procedure using the characteristic-measuring apparatus according to one or more embodiments (the bending method) of the present invention.

First, an end of the multi-mode fiber 13 is connected to the first end E1 of the multi-core fiber FB (the step S21). At this time, the end of the multi-mode fiber 13 is connected to the first end E1 of the multi-core fiber FB such that, at the first end E1 of the multi-core fiber FB, the plurality of cores C shown in FIG. 2A are covered with the core 13a of the multi-mode fiber 13 shown in FIG. 2B. Then, as shown in FIG. 1, the second end E2 of the multi-core fiber FB, in which the first end E1 thereof is connected with the multi-mode fiber 13, is arranged in the vicinity of the imaging device 14 (the step S22).

In addition, before the connection between the end of the multi-mode fiber 13 and the first end E1 of the multi-core fiber FB, a specific core C of the multi-core fiber FB may be made to be strongly excited, the second end E2 of the multi-core fiber FB may be arranged in the vicinity of the imaging device 14 as shown in FIG. 1, and thereby the position of the specific core C may be checked in an obtained image. The length of the multi-core fiber FB is, for example, 2 m or the like.

Next, in a state where bending of a first condition is applied to the multi-core fiber FB, the imaging device 14 images emission light L emitted from the multi-core fiber FB. To be specific, in a state where light is output from the light source 11, the imaging device 14 images the emission light L emitted from the second end E2 of the multi-core fiber FB while the wavelength of the emission light L is changed by controlling the wavelength variable filter 12. In this way, the above first image is obtained (the step S23). The bending of the first condition is, for example, a bending diameter of 280 mm×1 turn or the like.

Further, in a state where bending of a second condition is applied to the multi-core fiber FB, the imaging device 14 images emission light L emitted from the multi-core fiber FB. To be specific, in a state where light is output from the light source 11, the imaging device 14 images the emission light L emitted from the second end E2 of the multi-core fiber FB while the wavelength of the emission light L is changed by controlling the wavelength variable filter 12. In this way, the above second image is obtained (the step S24). The bending of the second condition is, for example, a bending diameter of 280 mm×1 turn and a bending diameter of 60 mm×1 turn, or the like.

At the time the first and second images are obtained, the light output from the light source 11 passes through the wavelength variable filter 12 and the multi-mode fiber 13 in this order and thereafter is coupled, at the first end E1 of the multi-core fiber FB, to the plurality of cores C provided in the multi-core fiber FB (the first step). The light coupled to the plurality of cores C is transmitted through each of the cores C, thereafter is emitted as the emission light L from the second end E2 of the multi-core fiber FB, and is imaged by the imaging device 14 at the same time (the second step).

When the second image is obtained, the calculating device 15 conducts calculation to determine the cut-off wavelength of the multi-core fiber FB based on the first and second images (the third step). To be specific, calculation is conducted to determine, at each wavelength, a ratio (an intensity ratio) between the first image obtained at the step S23 and the second image obtained at the step S24, and the wavelength in which a variation of the intensity ratio occurs is determined with respect to each core C (the step S25). In this way, the cut-off wavelengths of the plurality of cores C provided in the multi-core fiber FB are determined all together.

As described above, in one or more embodiments, light is coupled, at the first end E1 of the multi-core fiber FB, to the plurality of cores C provided in the multi-core fiber FB, the emission light emitted from the plurality of cores C is imaged at the second end E2 of the multi-core fiber FB at the same time, and the cut-off wavelengths of the multi-core fiber FB are determined based on the obtained images. In this way, the plurality of cores C provided in the multi-core fiber FB are multi-mode excited at the same time, and the cut-off wavelengths are measured from the spectral images having two-dimensional intensity distribution. On the other hand, in the prior art, the plurality of cores C provided in the multi-core fiber FB need to be individually multi-mode excited. Therefore, the cut-off wavelength of each core of the multi-core fiber FB can be simply and easily measured in a short time. In addition, the order between the condition for obtaining the first image and the condition for obtaining the second image can be exchanged unless an irreversible action such as a change in the fiber length occurs.

Figure 6:
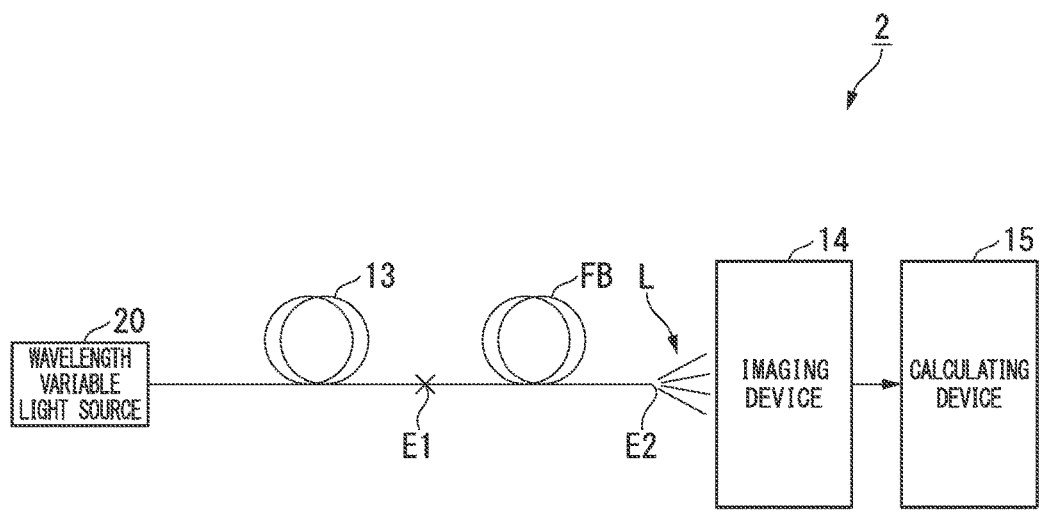
FIG. 6 is a block diagram showing a main part configuration of a characteristic-measuring apparatus for a multi-core fiber according to one or more embodiments of the present invention.

As another example, FIG. 6 is a block diagram showing a main part configuration of a characteristic-measuring apparatus for a multi-core fiber according to one or more embodiments of the present invention. As shown in FIG. 6, a characteristic-measuring apparatus 2 of one or more embodiments includes a wavelength variable light source 20 (a wavelength variable device) instead of the light source 11 and the wavelength variable filter 12.

The wavelength variable light source 20 outputs, to the multi-mode fiber 13, coherent light whose wavelength is capable of being changed within at least a wavelength band required to measure a characteristic of the multi-core fiber FB. The wavelength variable light source 20 can change the wavelength within, for example, the O-band (1260 to 1360 nm), the C-band (1530 to 1565 nm), the L-band (1565 to 1625 nm), some or one of these bands. For example, a light source including a semiconductor LD (laser Diode) and capable of changing the wavelength according to electric current supplied to the semiconductor LD can be used for the wavelength variable light source 20.

The characteristic-measuring apparatus 2 has, in other words, a configuration in which the wavelength variable device (the light source 11 and the wavelength variable filter 12) of the characteristic-measuring apparatus 1 shown in FIG. 1 is merely replaced with the wavelength variable light source 20, and conducts characteristic measuring of the multi-core fiber FB through a procedure similar to that of one or more embodiments described above. Therefore, a detailed description of the characteristic-measuring method for the multi-core fiber FB is omitted.

In one or more embodiments, light is coupled, at the first end E1 of the multi-core fiber FB, to the plurality of cores C provided in the multi-core fiber FB, the emission light emitted from the plurality of cores C is imaged at the second end E2 of the multi-core fiber FB at the same time, and the cut-off wavelength of each core of the multi-core fiber FB is determined based on obtained images. Therefore, the cut-off wavelength of each core of the multi-core fiber FB can be simply and easily measured in a short time.

Figure 7:
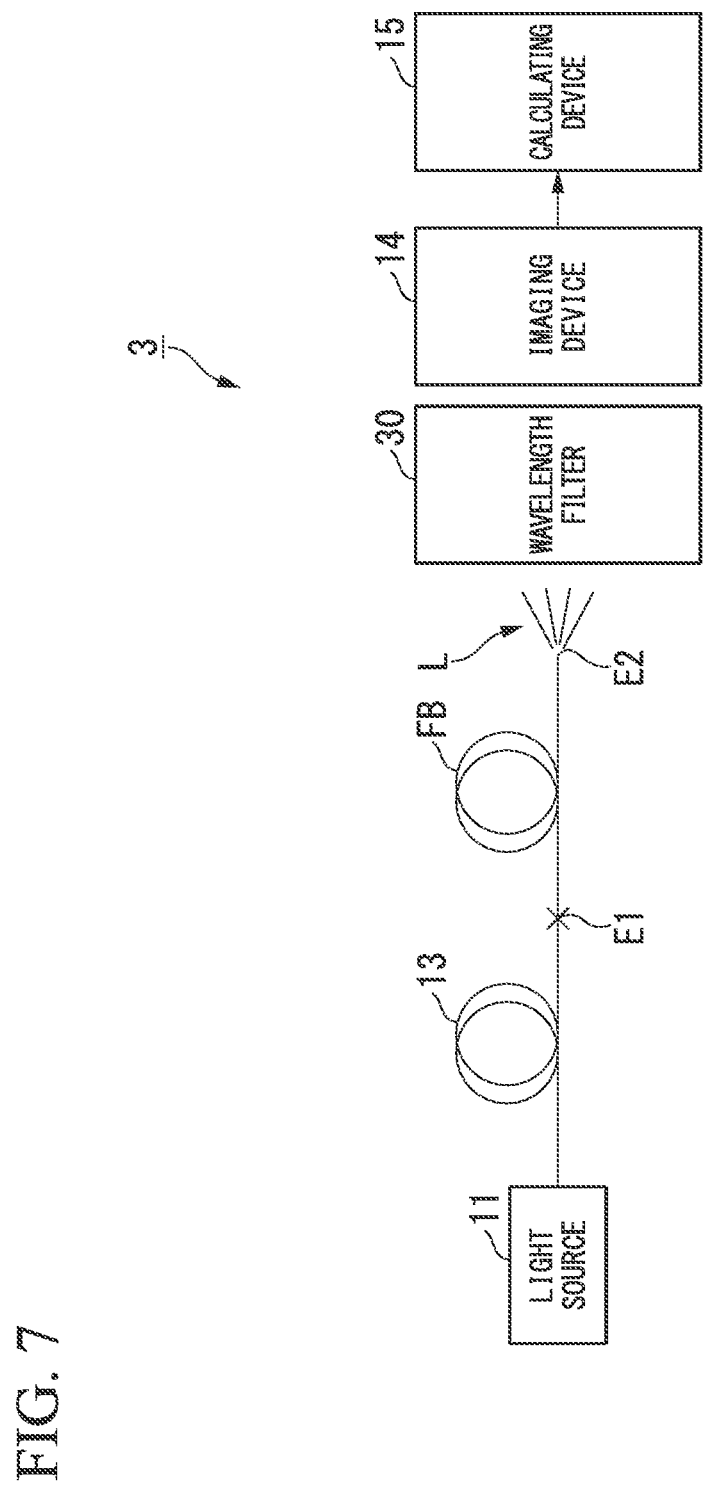
FIG. 7 is a block diagram showing a main part configuration of a characteristic-measuring apparatus for a multi-core fiber according to one or more embodiments of the present invention.

As another example, FIG. 7 is a block diagram showing a main part configuration of a characteristic-measuring apparatus for a multi-core fiber according to one or more embodiments of the present invention. As shown in FIG. 7, a characteristic-measuring apparatus 3 of one or more embodiments omits the wavelength variable filter 12 therefrom and including a wavelength filter 30 (a wavelength variable device, a second wavelength filter) between the second end E2 of the multi-core fiber FB and the imaging device 14.

The wavelength filter 30 extracts light having a specific wavelength component from the emission light L emitted from the second end E2 of the multi-core fiber FB and outputs the extracted light to the imaging device 14. Similarly to the wavelength variable filter 12 shown in FIG. 1, the wavelength filter 30 may be a filter capable of changing the wavelength component of light to be extracted or may be a filter not capable of changing the wavelength component of light to be extracted. In a case where the wavelength filter 30 is a filter not capable of changing the wavelength component of light to be extracted, a plurality of filters may be prepared in which the wavelength components of light to be extracted are different from each other, and the filters may be replaced as needed.

In one or more embodiments, each of the characteristic-measuring apparatus 1 shown in FIG. 1 and the characteristic-measuring apparatus 2 shown in FIG. 6 is an apparatus in which the wavelength of light to be led into the multi-core fiber FB is changed. On the other hand, the characteristic-measuring apparatus 3 of one or more embodiments is an apparatus in which incoherent light having at least a plurality of wavelength components within a wavelength band required to measure a characteristic of the multi-core fiber FB is led into the multi-core fiber FB, and the wavelength of light emitted from the multi-core fiber FB is changed.

The characteristic-measuring apparatus 3 has, in other words, a configuration in which the wavelength variable device (the wavelength variable filter 12) provided on the first end E1 side of the multi-core fiber FB shown in FIG. 1 is merely provided on the second end E2 side of the multi-core fiber FB, and conducts characteristic measuring of the multi-core fiber FB through a procedure similar to that of one or more embodiments described above. Therefore, a detailed description of the characteristic-measuring method for the multi-core fiber FB is omitted.

In one or more embodiments, light is coupled, at the first end E1 of the multi-core fiber FB, to the plurality of cores C provided in the multi-core fiber FB, the emission light emitted from the plurality of cores C is imaged at the second end E2 of the multi-core fiber FB at the same time, and the cut-off wavelength of each core of the multi-core fiber FB is determined based on obtained images. Therefore, the cut-off wavelength of each core of the multi-core fiber FB can be simply and easily measured in a short time.

Hereinbefore, although the embodiments of the present invention have been described, the present invention is not limited to the above embodiments, and various modifications can be freely adopted within the scope of the present invention. For example, a case where the cut-off wavelength that is a characteristic of the multi-core fiber FB is measured is described in the above embodiments, but other characteristics of the multi-core fiber FB may be measured. The other characteristics of the multi-core fiber FB include, for example, a loss of a multi-core fiber, polarization mode dispersion (PMD), effective core area ($A_{eff}$), mode field diameter (MFD) and the like.

The above characteristic-measuring apparatuses 1 and 3 of one or more embodiments are apparatuses to measure characteristics of the multi-core fiber FB using incoherent light, and the above characteristic-measuring apparatus 2 is an apparatus to measure characteristics of the multi-core fiber FB using coherent light. In the characteristic-measuring apparatus 2 that conducts measurement using coherent light, a higher order mode does not easily occur compared to the characteristic-measuring apparatuses 1 and 3 that conduct measurement using incoherent light.

In one or more embodiments, a higher order mode may be deliberately caused in the multi-mode fiber 13 by using a device such as a mode scrambler provided between the wavelength variable light source 20 and the multi-mode fiber 13. However, a speckle peculiar to the multi-mode fiber 13 may occur, and it may be difficult to excite a desired higher order mode in each core C of the multi-core fiber FB. In addition, in a case where the loss is measured over a broadband, a light source has to have the broadband. Therefore, in a case where the cut-off wavelength or the broadband loss of the multi-core fiber FB is measured, measurement is conducted using the characteristic-measuring apparatus 1 or 3.

In the one or more embodiments, characteristics of the multi-core fiber FB are measured through changing the wavelength of light to be led into the multi-core fiber FB, and in one or more embodiments, characteristics of the multi-core fiber FB are measured through changing the wavelength of light emitted from the multi-core fiber FB.

However, the wavelength of light does not have to be changed according to characteristics of the multi-core fiber FB to be measured. For example, effective core area ($A_{eff}$) or mode field diameter (MFD) can be measured without changing the wavelength.

Figure 8:
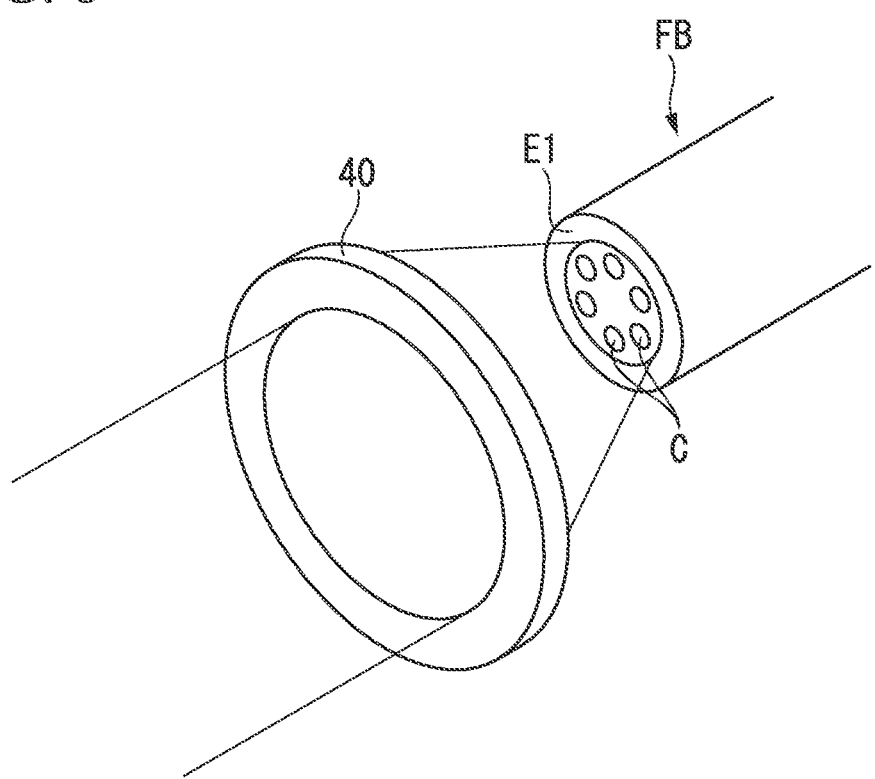
FIG. 8 is a perspective view showing another example of coupling method of light to a plurality of cores of a multi-core fiber.

In the one or more embodiments, light from a light source device is coupled to the plurality of cores C of the multi-core fiber FB through the multi-mode fiber 13. However, the multi-mode fiber 13 is not always used in order to couple light from the light source device to the plurality of cores C of the multi-core fiber FB, and the light may be coupled thereto using another method. FIG. 8 is a perspective view showing another example of coupling method of light to a plurality of cores of a multi-core fiber.

In an example shown in FIG. 8, a condenser lens 40 (a coupling device) is arranged on the first end E1 side of the multi-core fiber FB instead of the multi-mode fiber 13. The condenser lens 40 is a lens to condense, to the first end E1 of the multi-core fiber FB, light passed through the wavelength variable filter 12, when it is used for, for example, the characteristic-measuring apparatus 1 shown in FIG. 1. As shown in FIG. 8, the spot diameter of light condensed by the condenser lens 40 may be greater than or equivalent to that of a circumscribed circle of the plurality of cores C provided in the multi-core fiber FB. In addition, the coupling method using such a condenser lens 40 can be applied to the characteristic-measuring apparatuses 2 and 3.

In one or more embodiments, a case where the near-field image of the emission light L emitted from the plurality of cores C provided in the multi-core fiber FB is obtained is described as an example. However, the near-field image is not always obtained, and a far-field image may be obtained. That is, it is important to image, at the same time, the emission light L emitted from the plurality of cores C provided in the multi-core fiber FB, and which of the near-field image and the far-field image is imaged may be appropriately decided according to characteristics of the multi-core fiber FB to be measured.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A characteristic-measuring apparatus for a multi-core fiber, comprising:
   a coupler that couples, at a first end of the multi-core fiber, light to a plurality of cores in the multi-core fiber;
   an imager that comprises a camera and takes an image, at a second end of the multi-core fiber, of emission light emitted from the plurality of cores, wherein the plurality of cores is imaged at the same time; and
   a calculator that stores the image obtained by the imager and determines a characteristic of the multi-core fiber based on the image.

2. The characteristic-measuring apparatus for the multi-core fiber, according to claim 1, further comprising:
   a wavelength changer that changes a wavelength of light to be led into the multi-core fiber or of light emitted from the multi-core fiber.

3. The characteristic-measuring apparatus for the multi-core fiber, according to claim 2, wherein
the wavelength changer includes:
a light source that outputs incoherent light having at least a plurality of wavelength components within a wavelength band required to measure the characteristic of the multi-core fiber, and
a first wavelength filter that:
extracts light having a specific wavelength component from the incoherent light, and
outputs extracted light to the coupler.

4. The characteristic-measuring apparatus for the multi-core fiber, according to claim 2, wherein
the wavelength changer includes:
a wavelength variable light source that outputs, to the coupler, coherent light whose wavelength is capable of being changed within at least a wavelength band required to measure the characteristic of the multi-core fiber.

5. The characteristic-measuring apparatus for the multi-core fiber, according to claim 2, wherein
the wavelength changer includes:
a second wavelength filter that:
extracts light having a specific wavelength component from light emitted from the multi-core fiber, and
outputs the extracted light to the imager.

6. The characteristic-measuring apparatus for the multi-core fiber, according to claim 2, wherein:
the calculator determines the characteristic of the multi-core fiber based on the image, and
the image is obtained by the imager while the wavelength of light to be led into the multi-core fiber or of light emitted from the multi-core fiber is changed by the wavelength changer.

7. The characteristic-measuring apparatus for the multi-core fiber, according to claim 1, wherein
the coupler includes:
an optical fiber including a core having a diameter greater than or equal to that of a circumscribed circle of the plurality of cores.

8. The characteristic-measuring apparatus for the multi-core fiber, according to claim 7, wherein the imager is disposed apart from the second end of the multi-core fiber and takes the image of the emission light emitted from the plurality of cores and transmitted through a space between the second end of the multi-core fiber and the imager.

9. The characteristic-measuring apparatus for the multi-core fiber, according to claim 1, wherein the imager takes a near-field image, at the second end of the multi-core fiber, of the emission light emitted from the plurality of cores.

10. The characteristic-measuring apparatus for the multi-core fiber, according to claim 1, wherein the coupler is a multi-mode fiber.

11. The characteristic-measuring apparatus for the multi-core fiber, according to claim 1, wherein the coupler comprises a condenser lens in which a spot diameter of light condensed thereby is greater than or equal to that of a circumscribed circle of the plurality of cores in the multi-core fiber.

12. The characteristic-measuring apparatus for the multi-core fiber, according to claim 11, wherein the imager is disposed apart from the second end of the multi-core fiber and takes the image of the emission light emitted from the plurality of cores and transmitted through a space between the second end of the multi-core fiber and the imager.

13. The characteristic-measuring apparatus for the multi-core fiber, according to claim 1, wherein the calculator is configured to determine an intrinsic characteristic of the multi-core fiber based on the image.

14. The characteristic-measuring apparatus for the multi-core fiber, according to claim 1, wherein the calculator is configured to determine at least one of a cut-off wavelength, a loss, polarization mode dispersion, effective core area, and mode field diameter of the multi-core fiber based on the image.

15. A characteristic-measuring method for a multi-core fiber, comprising:
coupling, at a first end of the multi-core fiber, light to a plurality of cores in the multi-core fiber;
taking an image, at a second end of the multi-core fiber, of emission light emitted from the plurality of cores, wherein the plurality of cores are imaged at the same time; and
determining a characteristic of the multi-core fiber based on the image.

16. The characteristic-measuring method for the multi-core fiber, according to claim 15, wherein the image is taken at the second end of the multi-core fiber while a wavelength of light to be led into the multi-core fiber or of light emitted from the multi-core fiber is changed.

17. The characteristic-measuring method for the multi-core fiber, according to claim 15, wherein the light is coupled, at the first end of the multi-core fiber, to the plurality of cores in the multi-core fiber through a multi-mode fiber.

18. The characteristic-measuring method for the multi-core fiber, according to claim 15, wherein the light is coupled, at the first end of the multi-core fiber, to the plurality of cores in the multi-core fiber such that a spot diameter of the light is greater than or equal to that of a circumscribed circle of the plurality of cores.

19. The characteristic-measuring method for the multi-core fiber, according to claim 18, wherein the image of the emission light transmitted through a space from the plurality of cores in the multi-core fiber is taken.

20. The characteristic-measuring method for the multi-core fiber, according to claim 15, wherein an intrinsic characteristic of the multi-core fiber is determined based on the image.

21. The characteristic-measuring method for the multi-core fiber, according to claim 15, wherein at least one of a cut-off wavelength, a loss, polarization mode dispersion, effective core area, and mode field diameter of the multi-core fiber is determined based on the image.

* * * * *